(No Model.)

F. GLEASON.
DRIVE CHAIN.

No. 501,587. Patented July 18, 1893.

Witnesses
Jno. G. Hinkel
A. Nelson Dobson

Inventor
Francis Gleason
by
Attorneys

UNITED STATES PATENT OFFICE.

FRANCIS GLEASON, OF PHILADELPHIA, PENNSYLVANIA.

DRIVE-CHAIN.

SPECIFICATION forming part of Letters Patent No. 501,587, dated July 18, 1893.

Application filed September 7, 1892. Serial No. 445,259. (No model.)

*To all whom it may concern:*

Be it known that I, FRANCIS GLEASON, a citizen of the United States, residing at Philadelphia, in the county of Philadelphia and State of Pennsylvania, have invented certain new and useful Improvements in Chain-Links, of which the following is a specification.

My invention relates to drive chains, and it has for its object to provide a drive chain which shall be simple and cheap in construction, strong and durable in wear, and which shall be practically frictionless and the parts so arranged that dust, dirt and grit cannot get into the moving portions of the chain to wear or impede their action.

To these ends my invention consists in a drive chain embodying the general features of construction, arrangement, and mode of operation, substantially as herein more particularly set forth.

Figure 1:
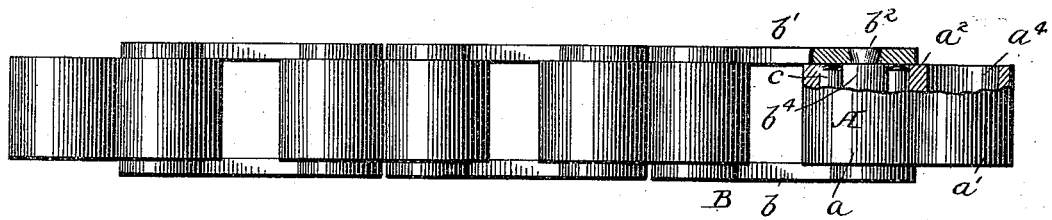
Figure 2:
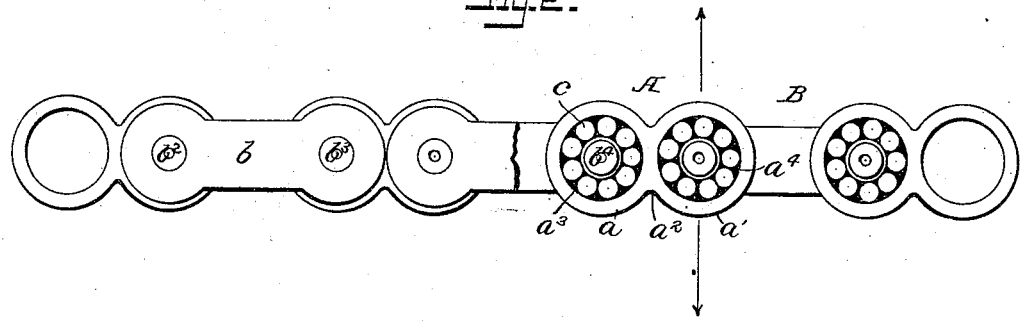
Figure 3:
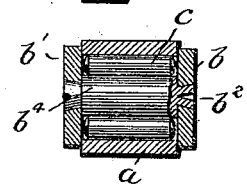

Referring to the accompanying drawings, Figure 1, is a plan view of a portion of a drive chain embodying my invention, a portion of the view being cut away to show the construction. Fig. 2, is a side view of a portion of the chain, a portion of the connecting links being removed to show the arrangement of the parts; and Fig. 3, is a vertical cross section on the line of the arrows Fig. 2.

While drive chains constructed in accordance with my invention may be used for many and various purposes, and the specific construction and arrangement of details be varied to suit the varying uses, I have shown my invention as embodied in a chain which is especially adapted for use with bicycles, velocipedes and the like, where it is desirable to have a light and yet strong chain, which shall offer the least amount of friction and which shall be protected from grit, dirt, or dust which would interfere with its operation, and cause wear or destruction of the parts, and I will now describe this embodiment of the invention.

The chain consists essentially of a combination of two different styles or forms of links, the one which I designate the roll links A, and the other, the connecting links B. The roll link A consists of a body of metal, preferably made in one piece, either cast, forged or otherwise formed, and having the general outline of the two cylinders $a$, $a'$, connected together at their sides $a^2$, the inner portion forming two comparatively large chambers $a^3$, $a^4$, to receive the antifriction devices, and the cross bars of the connecting link. I prefer to make the roll link of uniform thickness and from such material as Norway or horse shoe iron, which can be case hardened very effectually, thus presenting a hard wearing surface on all sides and still be very tough and strong. The connecting link B consists essentially of two side pieces $b$, $b'$, preferably having enlarged and rounded ends united by two cross pieces $b^2$, $b^3$. These cross pieces are in the form of round bars having their ends reduced and fitting openings in the connecting bars $b$, $b'$, while the central portion $b^4$ is in the shape of enlarged roll, and forms the bearing portion of the links. The ends of the cross pieces may be swaged or otherwise secured in the connecting bars after the chain is put together. The two links are united in forming the chain by placing one of the cross bars as $b^2$, into the opening as $a^3$ of the roll link, and in order to prevent friction, the space between the cross piece and the bearing surface of the roll link is provided with a series of longitudinal friction rolls $c$, arranged to practically fill the space between the cross bar $b^4$, and the interior of the cylinder A. These friction rolls are preferably made of hardened steel or other equivalent material and fit accurately in position, so that there is no play between the parts, and at the same time the parts can roll on each other so that there is little or no friction.

In making up the chain, it will be understood that one of the cross bars of two separate connecting links are applied to each of the two cylindrical openings in the roll link, and so on indefinitely, making the chain of any desired length to suit the purpose for which it is intended. It will be further observed that the enlarged ends of the connecting pieces $b$ are so shaped as to completely cover the opening in the cylinder of the roll link, as best seen in Fig. 3, so that the admission of dust, dirt or grit to the rolls is prevented. Moreover, the rolls being extended practically throughout the length of the cylinders, the parts have a substantial, rigid bearing, preventing sidewise movement, while at the same time the links are free to move around the bearing bars without friction.

In using the friction rolls, the friction on the cross bar or center bearing tending to turn it in the side links is so much less than in solid journals that it requires but little swaging at the ends where it is fitted to the side links, and I therefore prefer to use soft center steel, and while the outside is hard the center is soft enough to swage, and by making the holes in the side link conical as indicated in Fig. 3, and swaging the ends of the cross bar as shown, the links and cross bar or bearings are firmly connected together.

All chains now used on bicycles, so far as I am aware require more or less oiling, otherwise they soon cut out, and even oil does not help the matter much, as the oil catches the dust that comes in contact with the chain which soon works into the bearing cutting it and making the chain so loose in the journals that the pitch is lengthened and therefore does not match the pitch of the sprocket wheel, which is a great annoyance. In the friction roll links all this is avoided, as no oil is required—but a little graphite may be put into each roll case with the rolls. The chain thus made is exceedingly strong, the bearing bars being composed practically of two cylindrical portions joined together, or in other words made in one piece, with two cylindrical bearings in the end portions, and the connecting links uniting the bearing links are also light and strong, and further furnish a protecting cover for the anti-friction rolls.

What I claim is—

1. A drive chain comprising two sets of links, one consisting of two cylindrical portions united together and having open bearings, and the other composed of connecting pieces united by cross pieces forming bearings, and anti-friction rolls interposed between the bearing portions of the links, substantially as described.

2. A drive chain comprising two series of links, one composed of two cylindrical portions united together, and having internal bearings, the other composed of connecting pieces united by cross bars, the central portions of which are enlarged, anti-friction rollers interposed between the bearing surfaces of the links, and the ends of the connecting pieces being enlarged to cover the bearings in the roller links, substantially as described.

In testimony whereof I have signed my name to this specification in the presence of two subscribing witnesses.

FRANCIS GLEASON.

Witnesses:
JOHN McCLOSKEY,
WM. J. McCLOSKEY.